Patented Dec. 18, 1923.

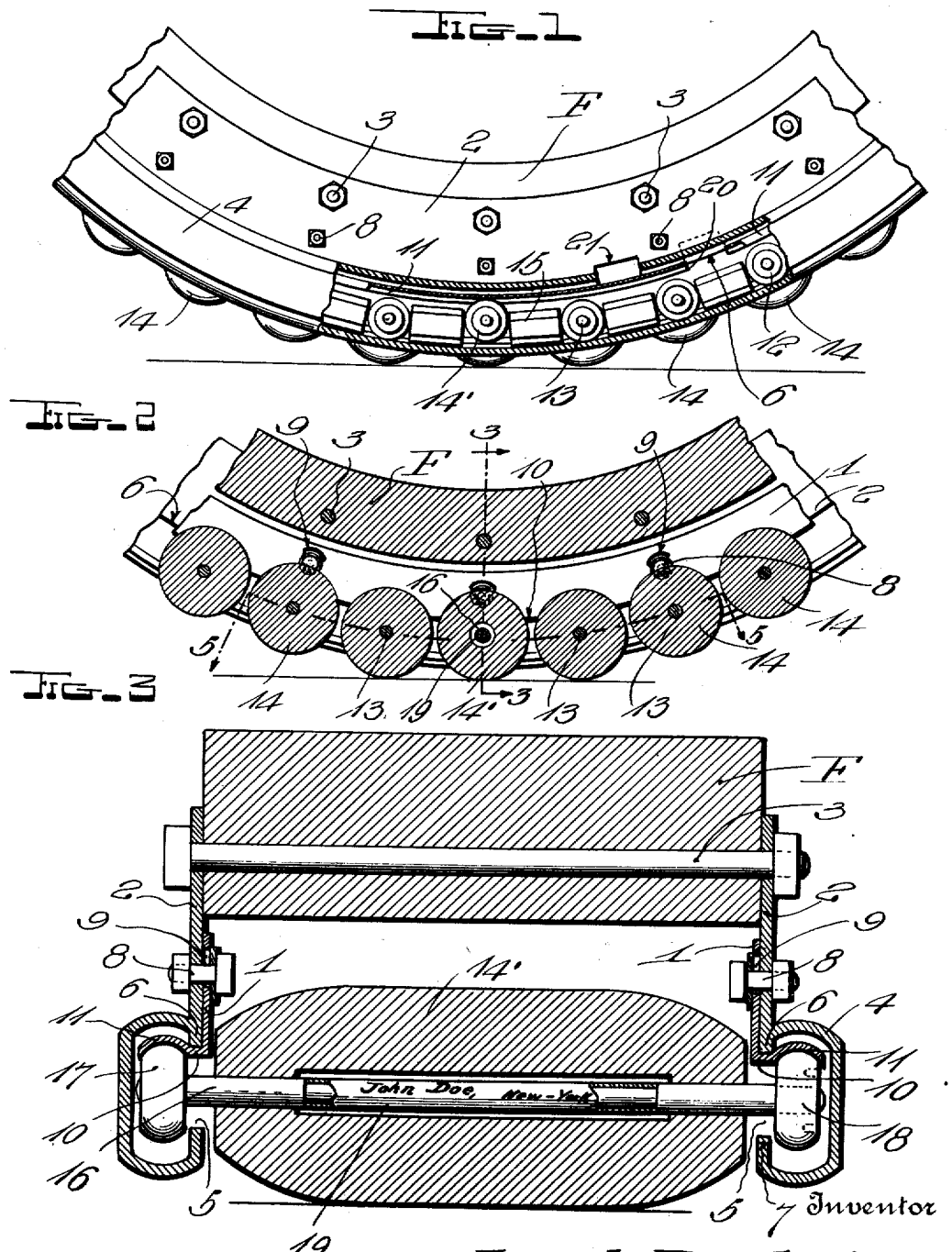

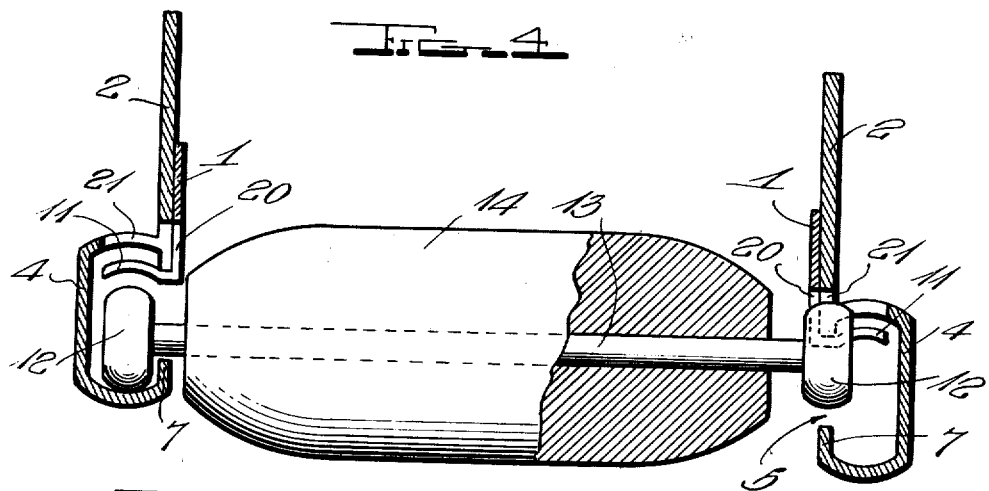
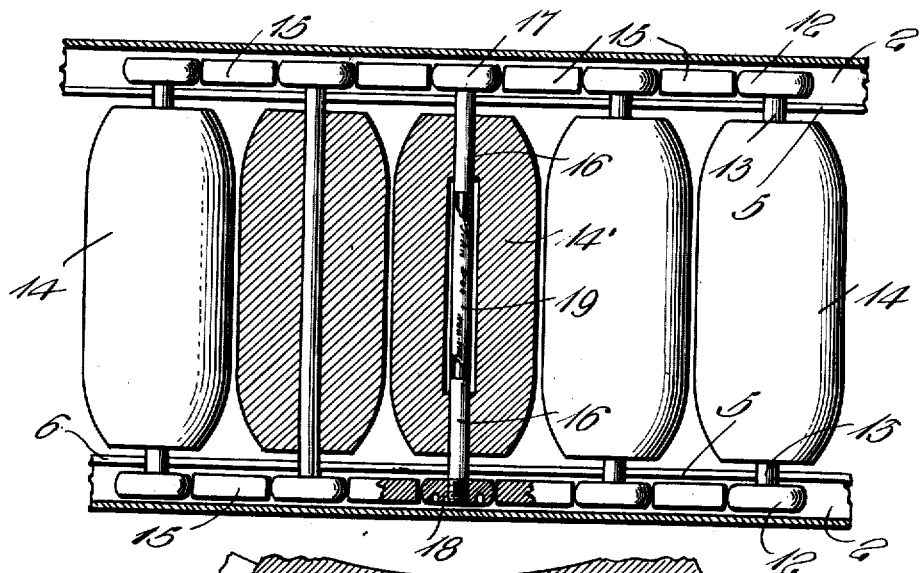
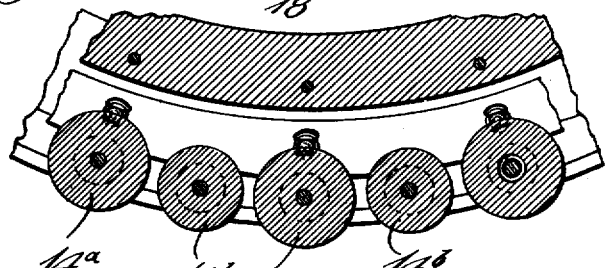

1,478,321

UNITED STATES PATENT OFFICE.

JOSEPH BERKEL, OF NEW YORK, N. Y.

WHEEL RIM AND TIRE.

Application filed July 6, 1922. Serial No. 573,063.

*To all whom it may concern:*

Be it known that I, JOSEPH BERKEL, a citizen of the United States, residing at Bronx, in the county of Bronx and State of New York, have invented certain new and useful Improvements in Wheel Rims and Tires, of which the following is a specification, reference being had therein to the accompanying drawing.

This invention relates to an improved wheel rim and tire and one object of the invention is to provide an improved type of wheel rim and tire consisting of inner and outer side rings fitted together in an improved manner and to provide improved rollers rotatably held in engagement with the side rings in an improved manner.

Another object of the invention is to so construct the inner and outer side rings that they may be provided with cutouts permitting the rollers to be put in place, the rings being then moved to place the cutouts out of registry to prevent the rollers from dropping out of place.

Another object of the invention is to so hold the inner rings in engagement with the outer rings that the inner rings which are engaged by circular heads at the ends of the axles for the rollers may have limited movement as the wheel turns and the lower portions of the inner rings are thus at all times kept in close contact with the outer rings.

Another object of the invention is to so construct the improved rim that it may be used in connection with a conventional structure of wheel having an ordinary wooden felly.

Another object of the invention is to so construct certain of the rollers that the axle thereof may be provided with the name of the owner of the vehicle thus providing a hidden identification means so that the vehicle may be readily identified in case it is stolen.

This invention is illustrated in the accompanying drawings, wherein:

Figure 1 is a view showing a fragment of the improved wheel rim shown partially in side elevation and partially in longitudinal section.

Figure 2 is a longitudinal sectional view through a fragment of the improved wheel rim and felly.

Figure 3 is a transverse sectional view taken along the line 3—3 of Fig. 2.

Figure 4 is a view similar to Fig. 3 and illustrates the manner of putting the rollers in place.

Figure 5 is a sectional view taken along the line 5—5 of Fig. 2.

Figure 6 is a view similar to Fig. 2 showing a slightly modified arrangement of rollers.

The improved wheel rim and tire structure will be used in connection with a conventional structure of wheel including a felly F which may be formed of wood or any suitable material. Only the felly F has been shown as the wheel will be of a conventional construction and any suitable wheel may be made use of. The rim which carries the tire-forming rollers is provided with inner and outer side plates or rings 1 and 2 which are to be positioned at opposite sides of the felly F with the outer plates or rings 2 secured to the felly by bolts 3 which pass through openings formed in the felly. Each of the outer rings 2 is provided with an outwardly extending annularly disposed pocket 4 which is closed at its upper and lower and outer sides and has its inner side open. The pocket will therefore be provided with an entrance opening 5 bordered by flanges 6 and 7 as shown in Fig. 3. The inner side rings 1 fit against the inner faces of the outer side rings 2 and are held in place by bolts 8 which extend through openings formed in the rings 2 and slots 9 formed in the rings 1. It should be noted that these slots 9 are elongated radially of the wheel and are of greater diameter than the bolts so that when the rings are in place, they will be held in close engagement with the inner faces of the rings 1 but will be permitted to have sliding movement upon the rings. Each of the inner side rings 1 is provided with an outstanding flange or collar 10 at its inner periphery which extends through the entrance opening 5 of the pocket 4 for engagement with the flange 6. This flange or neck 10 carries a transversely curved extension 11 which may be termed a track and is to be engaged by the rollers or heads 12 at the ends of the rods 13 which form axles for the ground-engaging rollers or tread members 14. Spacers 15 will be provided in the pockets 4 between the heads 12 of the bolts or axles 13 so that the rollers 14 will be held in the proper spaced relation to permit of easy rotation. One of the rollers which is indicated by the numeral 14' has its axle 16 provided at one end with a head 17 similar to the heads 12 of the axles 13 and has its other end portion threaded and carrying a head 18 which is in the form of a securing nut screwed upon the threaded end of the bolt. This axle 16 carries a removable sleeve 19 intermediate its length upon which the owner of the vehicle may have his name stamped. Therefore, if the vehicle is stolen and the owner should see a vehicle of the same make which resembles his and had wheels provided with this improved construction, he could very easily remove the axle 16 from the roller 14' and determine whether or not the car in question is his or someone else's car. In order to permit the rollers to be put in place, the inner and outer rings are provided with cutouts 20 and 21 which may be brought into registry when the bolts 8 are removed and thus provide passages of sufficient size to permit the heads of the rollers to be passed into the pockets 4. The securing nuts of the bolts 3 will first be removed so that the ring 2 at the right in Figure 3 may be removed from the felloe F and moved to the position shown in Figure 4. The rollers and the spacers will then be put in place and when the desired number have been put in place, the inner rings can be moved to the position shown in Fig 1. The cutouts 20 and 21 will then be out of registry and the securing bolts 8 can then be put in place to prevent the inner rings from moving sufficiently to bring the openings or passages into registry again. The bolts however permit the rings 1 to have sufficient movement with respect to the outer rings 2 so that the inner rings can be held in firm engagement with the lower portions of the flanges 6. By having the bolts 8 passed through large openings which will permit the rings to have movement in a vertical direction relative to the rings 2 the strain will be removed from the bolts 8 by the flanges 6 engaging the portions 10 of the rings 1 and there will be no danger of the bolts being bent or sheared off. It will thus be seen that the improved wheel has been provided with a rim and tire construction which will permit it to move easily over the ground. In Fig. 6, there has been shown a slight modification in which the rollers 14ᵃ are positioned between smaller rollers 14ᵇ. This variation in the sizes of the rollers will cause these rollers to have a tendency to sink into soft ground different amounts and a better grip upon the soft ground will be obtained.

I claim:

1. A rim and tire construction comprising outer side rings attached to opposite sides of a wheel felly, inner rings secured against the outer rings, said outer rings being provided with circumferentially extending pockets having their inner walls provided with annularly disposed passages and said inner ring being provided with outstanding circumferentially disposed flanges extending through said passages into said pockets and forming tracks, and rollers extending between said pockets and having axles extending into the pockets and having heads rotatably engaging said tracks.

2. The structure of claim 1 having the heads of greater diameter than the passages in the inner walls of the pockets of the outer rings to prevent movement of the heads out of the pockets when positioned therein, said inner and outer rings having cutouts permitting passage of said heads into and out of the pockets when the inner rings are moved to bring the cutouts thereof into registry with the cutouts of the outer rings.

3. A rim and tire construction comprising outer side rings attachable to opposite sides of a wheel felly, inner side rings fitting against the inner faces of said outer rings, removable means for securing the inner rings to the outer rings and permitting the inner rings to have limited sliding movement relative to the outer rings, the outer rings having circumferentially extending pockets having their inner walls provided with annularly disposed passages, the inner rings being provided with oustanding flanges extending into said pockets through said passages and constituting tracks, and rollers extending between said pockets and having axles terminating in heads rotatably engaging said tracks.

4. The structure of claim 1 and spacing elements in the pockets of the outer rings positioned between the heads of the rollers to hold said heads in proper spaced relation with the rollers out of contact.

5. A rim and tire construction comprising side portions having annular pockets open at their inner sides, rollers extending between said side portions, axles for said rollers having extended end portions, extending into said pockets, and heads for the ends of said axles, one axle having one of its heads removably mounted, and an identifying sleeve mounted upon the axle intermediate the length of the roller carried thereby and hidden from view by the roller.

6. A rim and tire construction comprising side portions having annular pockets open at their inner sides, rollers extending between said side portions, axles for said rollers having extended end portions extending into said pockets, and heads for the ends of said axles, one axle having one of its heads removably mounted for permitting easy removal of the roller and reduced in diameter intermediate its length to provide a seat, and an identifying sleeve fitting upon the reduced portion of said axle and hidden from view by the roller.

In testimony whereof I hereunto affix my signature.

JOSEPH BERKEL.

Certificate of Correction.

It is hereby certified that in Letters Patent No. 1,478,321, granted December 18, 1923, upon the application of Joseph Berkel, of New York, N. Y., for an improvement in "Wheel Rims and Tires," errors appear in the printed specification requiring correction as follows: Page 2, claim 1, line 80, for the word "rollers" read *tread members*, and line 81, for "axles" read *mounting rods;* same page, claim 3, line 108, for "rollers" read *tread members*, and line 110, for "axles" read *mounting rods;* claim 4, lines 114 and 116, for "rollers" read *tread members;* claim 5, lines 119 and 121, for "rollers" read *tread members*, and lines 126 and 127, for "roller" read *tread member;* same claim, lines 120 and 123, for "axles" read *rods*, and lines 123 and 125, for "axle" read *rod;* claim 6, line 130, page 2, and line 1, page 3, for "rollers" read *tread members*, and lines 6 and 10, for "roller" read *tread member;* same claim, lines 1 and 4, page 3, for "axles" read *rods*, and lines 4 and 9, for "axle" read *rod;* and that the said Letters Patent should be read with these corrections therein that the same may conform to the record of the case in the Patent Office.

Signed and sealed this 12th day of February, A. D., 1924.

[SEAL.]

KARL FENNING,
*Acting Commissioner of Patents.*